INVENTOR.
JAMES A. McDONALD
BY
William H. Meagher
Attorney

Feb. 18, 1969 J. A. McDONALD 3,428,855

TRANSISTOR DEFLECTION CONTROL ARRANGEMENTS

Filed May 14, 1965 Sheet 2 of 2

INVENTOR.
JAMES A. McDONALD
BY
William H. Meagher
Attorney

United States Patent Office 3,428,855

Patented Feb. 18, 1969

3,428,855

TRANSISTOR DEFLECTION CONTROL ARRANGEMENTS

James A. McDonald, Indianapolis, Ind., assignor to Radio Corporation of America, a corporation of Delaware Filed May 14, 1965, Ser. No. 455,730

U.S. Cl. 315—27 10 Claims

Int. Cl. H01j 29/70

ABSTRACT OF THE DISCLOSURE

Feedback from output stage of "Miller Integrator" sawtooth generator to a switching transistor establishes astable multivibrator action to render deflection circuit oscillatory. To ensure accurate synchronization of the oscillations, an auxiliary waveform is additionally fed back to switching transistor. Spiked sawtooth wave from output stage is integrated to develop at switching transistor input a generally parabolic voltage waveform, having a steep slope in the vicinity of the trace interval end; its presence renders timing of the turn-on of the switching transistor substantially insensitive to extraneous factors, such as noise or circuit parameter changes. Vertical hold control is effected via variable resistor in feedback path controlling slope steepness. Retrace pulses developed across the deflection winding are doubly integrated by a pair of RC integrators in cascade to develop a supplemental waveform for feedback to input of Miller circuit to provide desired S-shaping of the current through the winding.

This invention relates generally to transistor deflection circuits, and particularly to apparatus for controlling such parameters of operation, in said circuits, as the timing and waveshape of the deflection output waveform.

In a copending patent application, Ser. No. 455,736, of John B. Beck and Roland N. Rhodes, entitled "Transistor Deflection Circuits" and filed concurrently herewith, the application of the principles of the so-called "Miller Integrator" to transistor deflection circuits is discussed in detail, and resultant deflection circuits of an advantageous character for serving the vertical deflection function in a television receiver are disclosed. In such circuits, the receiver's vertical yoke winding is traversed by a desired current waveform in response to sawtooth voltage waveform generation across a capacitor in a negative feedback path looped around a high current gain transistor amplifier. The capacitor is subject to alternate charging and discharging in an operating cycle recurring at the (60 c.p.s.) television field rate, in response to the periodic conduction and non-conduction of a switching transistor.

A desirable overall arrangement for deflection circuits of the above-described character is to render the periodic control of the switching transistor oscillatory through multivibrator-like action between the switching transistor and the output transistor of the above-mentioned feedback amplifier. To this end, retrace pulses generated in the output circuit of the output transistor may be fed back to the switching transistor in a conduction-enhancing polarity. In television receiver use, the oscillatory action must be properly synchronized with the picture information to be displayed, whereby the application of vertical synchronizing pulses to synchronize the timing of the multivibrator transitions is appropriate.

A feature of the present invention relates to apparatus for enhancing the accuracy of the timing synchronization. In accordance with this feature, an auxiliary waveform (in addition to the above-noted flyback pulses) is derived from the output transistor and fed back to the input of the switching transistor. The shape of the auxiliary waveform is such as to provide a sharply changing transition at the end of the trace portion. Presence of this waveform at the switching transistor input effectively narrows the time period during which turn-on of the switching transistor (initiating retrace) can take place, tending to ensure sharp, positive synchronization. Additionally, by incorporating a variable impedance in the auxiliary waveform feedback path, a convenient facility for performing the manual vertical hold control function is provided.

Another feature of the present invention relates to the waveshape of the deflection current output. The Miller circuit operation tends to provide a highly linear sawtooth current. While this is desirable where the curvature of the picture tube screen bears a spherical surface relationship to the deflection center of the picture tube beam, this condition is not usually present, particularly where relatively flat viewing surfaces are desired and provided. In such case, linearity of the display calls for modification of the linear sawtooth, particularly a rounding-off of the sawtooth to provide a somewhat S-like configuration. Pursuant to the present invention, such desired S-shaping of the output current waveform is effected by means of flyback pulse feedback to the input of the Miller feedback amplifier via a suitable wave-shaping network. In accordance with an embodiment of the present invention, the wave-shaping network takes the form of a pair of RC integrators in cascade.

A primary object of the present invention is to provide a novel and improved transistor deflection circuit suitable for use in television receivers.

Additional particular objects of the present invention are to provide apparatus for obtaining proper timing and wave-shape for the output waveform of such deflection circuits.

Other objects and advantages of the present invention will be recognized by those skilled in the art after a reading of the following detailed description and an inspection of the accompanying drawings in which.

Figure 1:
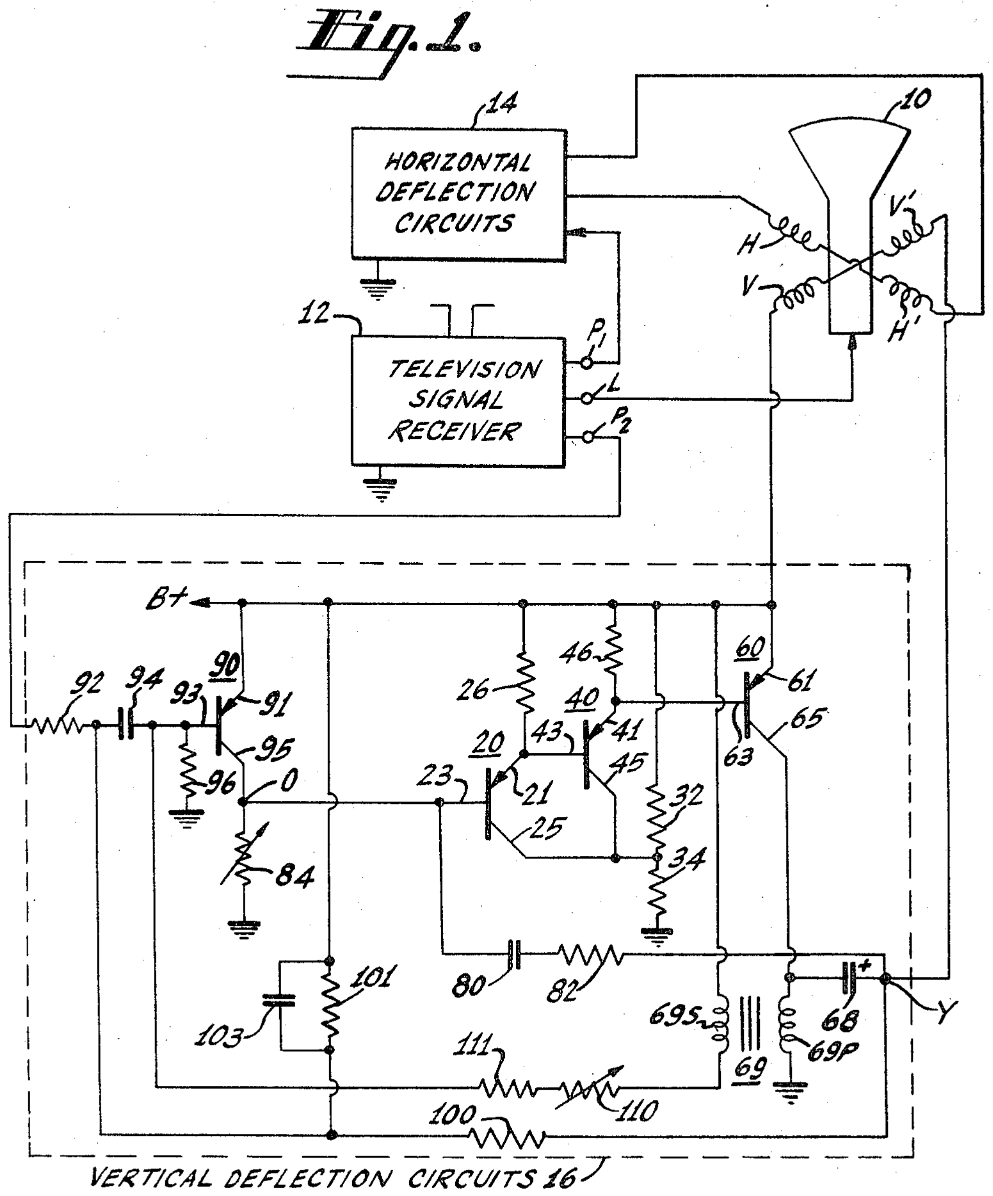
FIGURE 1 illustrates, in block and schematic form, a television receiver incorporating a vertical deflection circuit embodying the principles of the present invention.

In FIGURE 1, the bulk of the circuits of a television receiver, serving to provide signals for energizing a picture tube 10, are represented by a single block 12, labelled "television signal receiver." The receiver unit 12 may incorporate the usual elements requisite to provide video signals (at output terminal L) for appropriate intensity modulation of the picture tube's electron beam, as well as to provide suitable synchronizing pulse information (at output terminals $P_1$ and $P_2$) to synchronize, in respective horizontal and vertical deflection circuits 14 and 16, the energization of the respective windings (H, H' and V, V') of the picture tube's deflection yoke.

Before describing the specific problem solution provided by the circuit features of the present invention, a general description of the operation of the deflection circuit 16 of FIGURE 1 is in order.

In the vertical deflection arrangement of FIGURE 1, sawtooth current waveform is caused to pass through the vertical deflection windings V and V' of the deflection yoke, the windings V and V' being connected in series between the receiver's source of unidirectional potential (B+) and the yoke input terminal Y. The flow of the desired sawtooth current waveform in the windings, which appear essentially resistive, is in response to the development of a sawtooth voltage waveform at terminal Y. The development of this sawtooth voltage waveform is effected through use of a transistorized arrangement employing the principles of the "Miller Integrator."

Transistors 20, 40 and 60 are cascaded to form a high current gain amplifier. Negative feedback is established between the amplifier output and the amplifier input via a path incorporating a capacitor 80. Capacitor 80 is subject to alternate charging and discharging, per switching action of transistor 90. The amplifier output voltage waveform (at terminal Y) is a substantially linear sawtooth voltage waveform per "Miller Integrator" principles.

When transistor 90 is conducting, it shorts the feedback amplifier input terminal O (at the base of transistor 20) to the B+ potential source; when transistor 90 is non-conducting, terminal O sees the transistor 90 stage as an open circuit. Switching of transistor between these two states occurs on a recurrent, oscillatory basis, transistor 90 cooperating with the output transistor 60 in the fashion of an astable multivibrator.

Multivibrator action is sustained by the coupling of the output electrode (collector 95) of transistor 90 to the input electrode (base 63) of transistor 60 via transistors 20 and 40, and the coupling of the output electrode (collector 65) of transistor 60 to the input electrode (base 93) of transistor 90 via a feedback resistor 100. Synchronization of the multivibrator action is effected through the application of synchronizing pulses from terminal $P_2$ to base 93 via a resistor 92 in series with a capacitor 94. The feedback resistor 100 is connected between the yoke input terminal Y and the junction of resistor 92 and capacitor 94. A parallel RC network comprising resistor 101 shunted by capacitor 103, is coupled between the aforesaid junction and the B+ source, and serves a pulse shaping function, partially integrating the vertical flyback pulses fed back from terminal Y, and discriminating against the undesired feedback of horizontal frequency pulses, which may undesirably be induced in the vertical yoke winding via coupling from the horizontal yoke windings.

Transistor 20 is arranged in an emitter follower configuration, its emitter electrode 21 being connected via an emitter resistor 26 to the receiver's B+ terminal. Transistor 40 provides a second emitter follower stage, appearing as an emitter load of the transistor 20 emitter follower, the base electrode 43 of transistor 40 being directly connected to emitter electrode 21, and the emitter electrode 41 of transistor 40 being connected via an emitter resistor 46 to the B+ terminal. The collector electrodes 25 and 45 of the two emitter follower stages are jointly connected to an appropriate division point on a low impedance voltage divider connected between B+ and chassis ground; the voltage divider comprises the series combination of resistors 32 and 34, with the collector electrodes connected to the junction of the series resistors.

The output of the cascaded emitter follower stages is applied to the base electrode 63 of output transistor 60, base 63 being directly connected to emitter 41. The emitter 61 of transistor 60 is connected to the B+ terminal. A direct current conductive path between the collector electrode 65 of transistor 60 and chassis ground is provided through a transformer primary winding 69P. An alternating current signal path is also provided between the collector 65 and the emitter 61, this path comprising, in series, a DC blocking capacitor 68 and the vertical yoke windings V, V'. The aforementioned yoke input terminal Y appears at the junction of blocking capacitor 68 and the yoke winding V'.

Feedback between terminal Y and the base input of transistor 20 is provided via a path comprising resistor 82 in series with the capacitor 80. A variable resistor 84 connects the base 23 to chassis ground. The nature of the feedback provided via capacitor 80 is negative, since the emitter follower stages 20 and 40 produce no signal phase reversal, whereby only a single phase reversal (i.e., that contributed by stage 60) is provided within the feedback loop.

To appreciate the mode of operation of the apparatus heretofore recited, it may be convenient to first consider the operation assuming the omission of emitter follower stages 20 and 40, i.e., whereby terminal O would be directly connected to the base 63 of output transistor. When transistor 90 is non-conducting and transistor 60 completes turn-on, a charging circuit for capacitor 80 is established between B+ and chassis ground, the circuit comprising the series combination of the conducting output transistor 60, blocking condenser 68, resistor 82, capacitor 80, and variable resistor 84. Assuming resistor 84 to be large in resistance value relative to the resistance values of resistor 82, resistor 84 will be primarily determinative of the charging rate (and may, accordingly, conveniently serve as a manual height control). The negative feedback action tends to oppose changes in the potential at terminal O during the charging period; the current through resistor 84 is accordingly relatively constant. A capacitor charging current of such relatively constant character assures a high degree of linearity of the resultant sawtooth voltage. The charging time constant is effectively considerably larger than that suggested by the physical values of capacitor 80 and resistor 84 due to the dynamic action of the amplifier which multiplies the effective capacitance by a factor dependent upon the amplifier gain.

When transistor 90 is conducting, transistor 60 is driven to cut-off, and a discharging circuit for capacitor 80 is completed comprising, in series, the conducting transistor 90, capacitor 80, resistor 82, and the yoke windings V, V'. Resistor 82 primarily determinative of the discharging rate with resistor 82 appropriately smaller than resistor 84, per the previous assumption, the discharging time constant is much shorter than the charging time constant.

From the foregoing simplified description, it can be seen that the effect of the periodic switching of transistor 90 between conducting and non-conducting states is to develop across capacitor 80 (i.e., at terminal Y with respect to chassis ground) a substantially linear sawtooth voltage waveform, resulting in the desired sawtooth current waveform flowing through the effectively resistive yoke windings V, V'.

However, it should be appreciated that for the above described type of operation to take place, it is essential that the transistor amplifier present a very high input impedance to terminal O. As a practical matter, while special transistors such as those of the so-called MOS type may inherently present high input impedances, the conventional transistor is a relatively low input impedance device. Thus, if transistor 60 were a conventional transistor and were relied upon as the sole amplifying device within the feedback loop, its relatively low input impedance would deteriorate the capacitor charging action desired. However, by interposing the transistor emitter follower stages between terminal O and the base input of transistor 60, this problem is solved. That is, terminal O now sees very high input impedance; i.e., the input impedance of an emitter follower, incorporating in its emitter load a further emitter follower, which in turn incorporates in its emitter load the input impedance of transistor 60. The net input impedance presented by this combination is sufficiently large to permit the desired charging action.

The emitter follower stages also serve to contribute current gain within the negative feedback loop, whereby a high current gain amplifier is realized. The capacitance multiplying effect of the arrangement is thereby enhanced. Through reliance on this capacitance multiplying effect, problems of instability and/or expense associated with the use of large-valued-electrolytic capacitors as the sawtooth capacitor may be avoided. The effect of a large valued capacitor may be obtained, though the actual capacitor used as capacitor 80 may be a relatively small, stable and inexpensive capacitor of the paper type (of a .1 microfarad value, for example).

With a general description of the desired operation of the FIGURE 1 circuit now completed, it is in order to consider the timing control feature of the present invention as embodied in FIGURE 1.

In addition to the main oscillation sustaining feedback path (including resistor 100), the FIGURE 1 circuit includes a further path for signal feedback to the input of switching transistor 90. The auxiliary waveform fed back to base 93 by this path is derived from the secondary winding 69S of transformer 69, the primary winding (69P) of which provides a DC return for the collector 65 of output transistor 60. The derived waveform takes the form of a sawtooth plus retrace spike. It is fed back to base 93 via a resistive path including variable resistor 110 in series with fixed resistor 111. This resistive path cooperates with the capacitance presented at base 93 to integrate the derived waveform, producing a generally parabolic waveform at base 93. The produced waveform has a steep slope in the vicinity of the trace interval end, and its presence at the base 93 tends to render timing of the turn-on of transistor substantially insensitive to extraneous factors, such as noise or circuit parameter changes. Variable resistor 110 provides a control of the noted steep slope, and hence is suitable as a manual vertical hold control.

Figure 2:
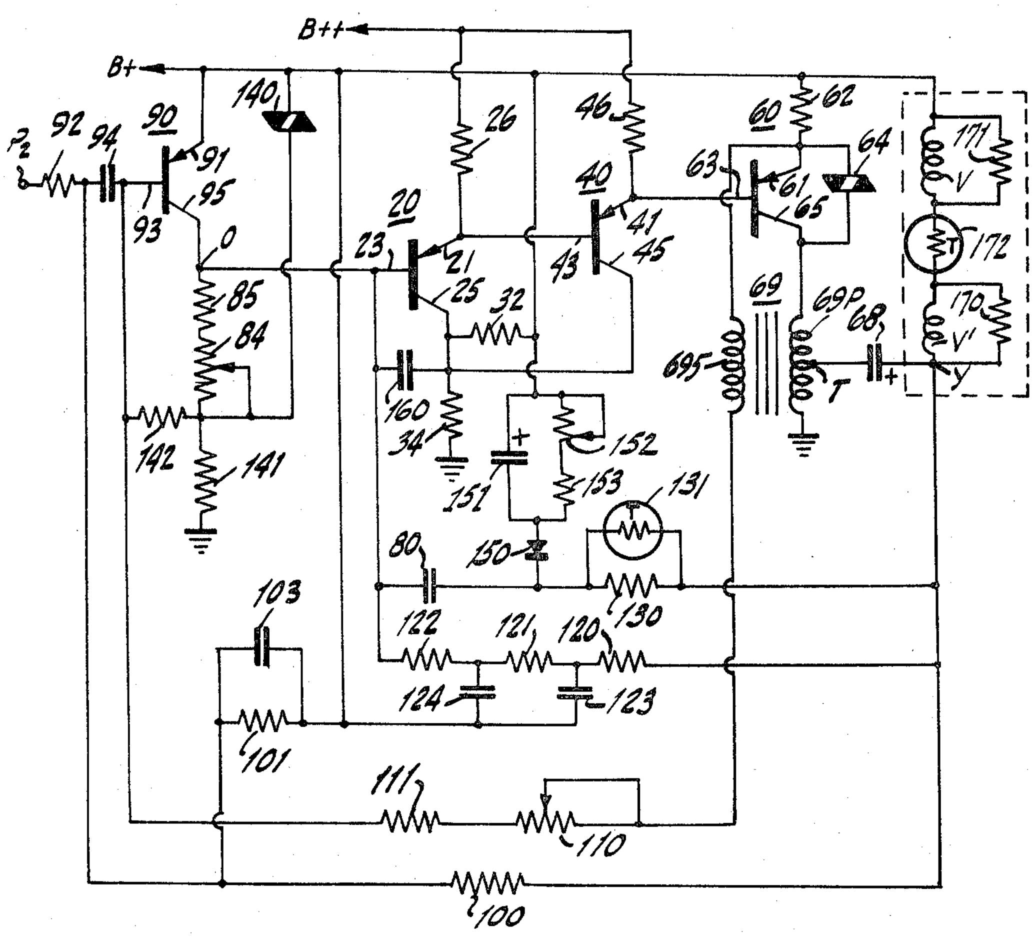
FIGURE 2 illustrates schematically a modification of the embodiment of FIGURE 1.

In FIGURE 2, a modification of the vertical deflection arrangement of FIGURE 1 is illustrated. Where possible, the same reference numerals employed in FIGURE 1 are re-employed in FIGURE 2 to designate elements of corresponding character and function. The embodiment of FIGURE 2 incorporates a number of features of other copending applications, filed concurrently herewith, as will be indicated in detail subsequently.

It may be observed that the general configuration of the FIGURE 1 embodiment is continued in FIGURE 2, with the emitter follower stage 20 having its base connected to terminal O, its emitter output driving emitter follower stage 40, which in turn drives output transistor stage 60. The yoke windings V, V′ are, as in FIGURE 1, connected in series with a DC blocking capacitor 68 between a B+ point and a point in the collector circuit of the output transistor 60. Yoke input terminal Y, at the junction of capacitor 68 and yoke winding V′ is coupled back to the base electrode 23 of transistor 20 via negative feedback path including sawtooth capacitor 80. A resistive path between terminal O and chassis ground includes, inter alia, the variable resistor 84. The multivibrator action between transistor 90 and output transistor 60 is effected as in FIGURE 1, and synchronization in response to the synchronizing pulses appearing at terminal $P_2$ is retained.

In the Miller feedback path of FIGURE 2, there is included, in series with capacitor 80, a resistive network comprising fixed resistor 130, shunted by a thermistor 131. This network provides an impedance for the capacitor discharging circuit which automatically adjusts in value with temperature changes to avoid adverse effects of temperature variations on deflection linearity. Further considerations of this feature will be found in another copending application, Ser. No. 455,685, of James A. McDonald, entitled "Temperature Compensation of Deflection Circuits" and also concurrently filed herewith. This latter McDonald application also provides an explanation for another feature of the FIGURE 2 circuitry, viz. the return of emitter resistors 26 and 46 to a unidirectional potential source (B++) of greater magnitude than the B+ potential source. Problems of thermal stability are solved by such connections, whereby assurance that transistor 60 will be cut off when transistor 90 is conducting is provided under most adverse temperature conditions.

In the FIGURE 2 circuitry the height controlling variable resistor 34 is associated in series with a fixed series resistor 85, the latter serving a range limiting function. Moreover the series combination of resistors 84 and 85 returns terminal O, not to chassis ground, but rather to an intermediate point on a voltage divider formed by the series combination of a voltage dependent resistor (VDR) 140 and a fixed resistor 141, the intermediate return point being junction resistors 140 and 141. The base 93 of transistor 90′ is also returned to this intermediate divider point by means of a resistor 142. The purpose of this arrangement is the stabilization of vertical deflection amplitude in the face of such parameter variations as line voltage changes. This feature is discussed at greater length in the copending application, Ser. No. 455,748, of Todd J. Christopher and James A. McDonald, entitled "Size Stabilization" and concurrently filed herewith, now U.S. Patent No. 3,388,285, issued June 11, 1968.

A further feature of the FIGURE 2 circuitry involves the functioning of diode 150. Diode 150 has its cathode electrode directly connected to the junction of sawtooth capacitor 80 and discharge resistor 130; the anode electrode of diode 150 is coupled by means of an RC network to the B+ potential source. The RC network includes a large valued capacitor 151 shunted by the series combination of a variable resistor 152 and a fixed resistor 153. The diode 150 network serves a "jitter" clamp function, forstalling any tendency of the feedback amplifier 20–40–60 to oscillate at a subharmonic of the vertical deflection frequency. The nature of the clamp circuit operation renders variable resistor 152 suitable for serving as a linearity control for the deflection circuit. For further details on this clamp circuit and linearity control arrangement reference may be made to another copending application, Ser. No. 455,682, of James A. McDonald and Todd J. Christopher, entitled "Deflection Control" and also concurrently filed herewith. Also discussed in said McDonald et al. application is the use of a capacitor 160 coupled between the collector 25 and the base 23 of transistor 20 for suppression of spurious high frequency oscillations. Still another feature of the said McDonald et al. application involves the utilization of a very low valued resistor 62 in the emitter return of transistor 60. In normal operation, the resistance value of resistor 62 is so very low (e.g., less than one ohm) as to have substantially no noticeable effect. However, should receiver turn-on conditions tend to result in the settling of transistor 60 into a highly conducting state approaching saturation, sufficient voltage will be developed across this resistor, and fed back to the base of transistor 90′ (via feedback winding 69S in series with resistors 110 and 111) to initiate the desired multivibrator action.

It will be noted that the details of the yoke shown in FIGURE 2 reveals additional elements 170, 171 and 172 beyond those shown in the FIGURE 1 embodiment. Resistors 170 and 171, individually shunting the respective vertical yoke winding halves V and V′ serve well known damping functions. Thermistor 172, interposed between the winding halves in the yoke current path, serves to stabilize the yoke current amplitude in the face of temperature variations which may affect the effective resistance of the yoke windings, as disclosed in U.S. Patent No. 2,900,564, issued to William A. Barkow on Aug. 18, 1959.

A protection function is served by VDR 64, connected directly in shunt with the collector-emitter path of output transistor 60. The VDR 64 tends to limit the retrace pulse peak developed between collector 61 and emitter 65 when transistor 60 is rendered non-conducting; in its low resistance state under the peak voltage conditions, the VDR 64 bypasses the peak current to a substantial degree, precluding heavy current through the transistor at a time of high potential so as to avoid possible transistor damage.

The timing control features of the present invention are carried out in the FIGURE 2 circuit in essentially the same manner as described in connection with FIGURE 1. The auxiliary waveform derivation from transformer 69, and its feedback via hold control 110 and resistor 111 to the base 93 of the switching transistor 90, accomplish the same timing control action previously described. The return of the winding 69S to B+ via the low valued emitter resistor 62 (per the above-noted antilockon feature) does not interfere with such functioning.

An additional feature of the present invention is presented for the first time in the FIGURE 2 embodiment. This additional feature relates to the previously discussed S-shaping problem i.e., the desire to round off the ends of the sawtooth current waveform in the yoke, in order to achieve a linear display on a flat-screen picture tube. The apparatus provided for achieving such S-shaping in the FIGURE 2 circuit involves a feedback of vertical retrace pulses appearing at terminal Y to the Miller amplifier input (base 23) via an appropriate wave-shaping network. This network comprises a trio of resistors 120, 121 and 122 connected in series, in the order named, between terminal Y and base 23. A capacitor 123 is connected between the junction of series resistors 120 and 121 and the B+ potential source; an additional capacitor 124 is connected between the junction of series resistors 121 and 122 and the B+ potential source. The effect of this network is to provide a doubly integrated version of the vertical flyback pulse wave to the input of the feedback amplifier 20–40–60. Such a waveform, when subject to the integrating action of the amplifier, results in a voltage waveform across the yoke windings V, V', which provides the desired S-shaping of the current through the windings.

By way of example, a set of values for the circuit parameters of FIGURE 2, which values have proved satisfactory in operation, is presented in the previously mentioned copending Beck and Rhodes application, and reference may be made thereto for such illustrative information.

What is claimed is:

1. In a television receiver, a vertical deflection circuit comprising the combination of:

a transistor amplifier having an input terminal and an output terminal and providing appreciable current gain therebetween;

a vertical deflection winding coupled to said output terminal;

means for establishing a negative feedback path between said output terminal and said input terminal of said amplifier, said feedback path including a capacitor;

impedance means for connecting said amplifier input terminal to a point of reference potential;

a transistor device subject to periodic switching between conductive and non-conductive states;

means including a connection between said device and said input terminal for alternately permitting charging of said capacitor through said impedance means when said transistor device is in a non-conductive state and discharging said capacitor through said transistor device when said transistor device is in a conductive state;

means for deriving a spiked sawtooth waveform from the output of said transistor amplifier;

means for integrating said derived waveform to provide a generally parabolic waveform having a relatively steeply sloping portion, said parabolic waveform being applied to said transistor device such that switching of said device to its conductive state is controlled in its timing by the steeply sloping portion thereof.

2. Apparatus in accordance with claim 1 wherein said vertical deflection circuit is rendered free-running by means establishing astable multivibrator action between said transistor device and said transistor amplifier and including a positive feedback path between an output of said transistor amplifier and an input of said transistor device.

3. Apparatus in accordance with claim 2 wherein means are associated with said positive feedback path for discriminating against feedback of horizontal deflection frequency components.

4. Apparatus in accordance with claim 3 wherein said spiked sawtooth waveform deriving means includes the secondary winding of a transformer having a primary winding responsive to the output of said transistor amplifier;

and wherein said integrating means includes a variable resistance path linking said secondary winding to an input of said transistor device, said variable resistance path providing means for manually controlling the slope of the steeply sloping portion of said parabolic waveform whereby the frequency of said astable multivibrator action may be adjusted.

5. In a television receiver, a vertical deflection circuit comprising the combination of:

a transistor amplifier having an input terminal and an output terminal and providing appreciable current gain therebetween;

a vertical deflection winding coupled to said output terminal;

means for establishing a negative feedback path between said output terminal and said input terminal of said amplifier, said feedback path including a capacitor;

impedance means for connecting said amplifier input terminal to a point of reference potential;

a transistor device subject to periodic switching between conductive and non-conductive states;

means including a connection between said device and said input terminal for alternately permitting charging of said capacitor through said impedance means when said transistor device is in a non-conductive state and discharging said capacitor through said transistor device when said transistor device is in a conductive state;

means for deriving a spiked sawtooth waveform from the output of said transistor amplifier;

means for integrating said derived waveform to provide a generally parabolic waveform having a relatively steeply sloping portion;

means for applying said parabolic waveform to said transistor device such that switching of said device to its conductive state is controlled in its timing by the steeply sloping portion thereof;

said integrating means including a variable resistor for manually controlling the slope of the steeply sloping portion of said parabolic waveform.

6. Apparatus in accordance with claim 5 wherein said vertical deflection circuit additionally includes means providing a second negative feedback path between said output terminal and said input terminal of said amplifier, said second feedback path providing means including a pair of integrating networks in cascade and serving to ensure S-shaping of the current in said vertical deflection winding.

7. In a television receiver, a vertical deflection circuit comprising the combination of:

a transistor amplifier having an input terminal and an output terminal, said amplifier providing a high current gain therebetween;

a vertical deflection winding coupled to said output terminal;

means for establishing a negative feedback path between said output terminal and said input terminal of said amplifier, said feedback path including a capacitor;

impedance means for connecting said amplifier input terminal to a point of reference potential;

means, including a semiconductor device connected to said input terminal and subject to periodic switching between conductive and non-conductive states, for subjecting said capacitor to periodically alternating charging and discharging actions;

and means, including a pair of integrating networks in cascade, providing a second feedback path between said output terminal and said input terminal of said amplifier.

8. In a television receiver vertical deflection circuit comprising the combination of:

a transistor amplifier including an input stage presenting an input terminal and an output stage presenting an output terminal;

a vertical deflection winding coupled to said output terminal;

means for establishing a first negative feedback path between said output terminal and said input terminal of said amplifier, said feedback path including a capacitor;

impedance means for connecting said amplifier input terminal to a point of reference potential;

a discharge transistor including a control electrode and subject to periodic switching between conductive and non-conductive states;

means including a connection between said discharge transistor and said input terminal for alternately permitting charging of said capacitor through said impedance means when said discharge transistor is in a non-conductive state and discharging of said capacitor through said discharge transistor when said discharge transistor is in a conductive state;

and means including a first positive feedback path between said output stage and the control electrode of said discharge transistor for establishing astable multivibrator action between said discharge transistor and said output stage;

the improvement which comprises the combination of:

means for deriving from said output stage a voltage wave in the form of a trace interval sawtooth plus a retrace interval pulse;

and integrating means providing a second positive feedback path between said deriving means and the control electrode of said discharge transistor, said integrating means developing at said control electrode a voltage of a generally parabolic form having a relatively steeply sloping portion in the vicinity of the trace interval end.

9. Apparatus in accordance with claim 8 wherein said output stage drives the primary winding of a transformer, wherein said deriving means includes a secondary winding of said transformer, and wherein said integrating means includes variable resistance means for adjusting the slope of said steeply sloping waveform portion to control the frequency of said astable multivibrator action.

10. Apparatus in accordance with claim 9 also including means for S-shaping the current in said vertical deflection winding, said S-shaping means comprising integrating means providing a second negative feedback path between said output stage and said input terminal.

References Cited

UNITED STATES PATENTS

| | | | |
|---|---|---|---|
| 3,178,593 | 4/1965 | Diehl | 315—27 |
| 3,221,269 | 11/1965 | Davies | 315—27 |
| 3,229,151 | 1/1966 | Attwood | 315—27 |
| 3,247,419 | 4/1966 | Attwood | 315—27 |
| 3,275,847 | 9/1966 | Kitchin | 315—27 |

RODNEY D. BENNETT, *Primary Examiner.*

B. L. RIBANDO, *Assistant Examiner.*